C. H. JENKINS.
FLEXIBLE PIPE JOINT.
APPLICATION FILED JULY 3, 1908.
910,687.
Patented Jan. 26, 1909.
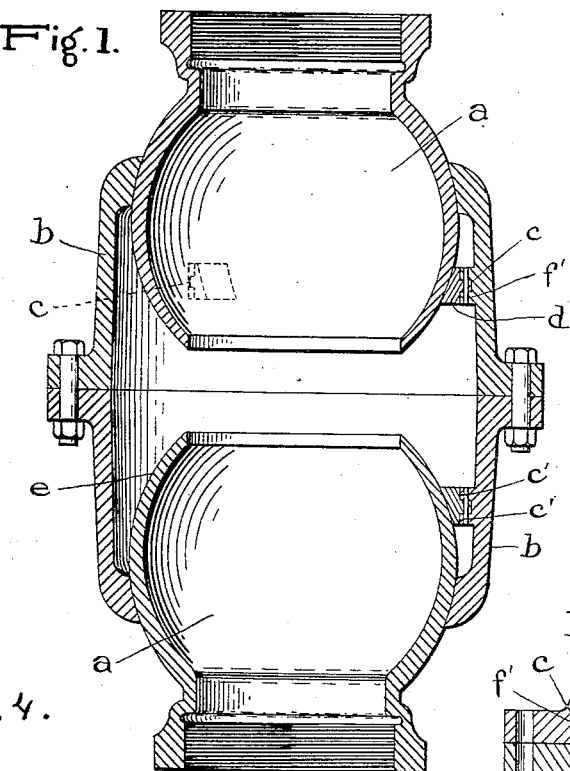
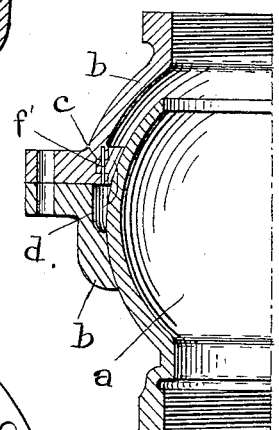
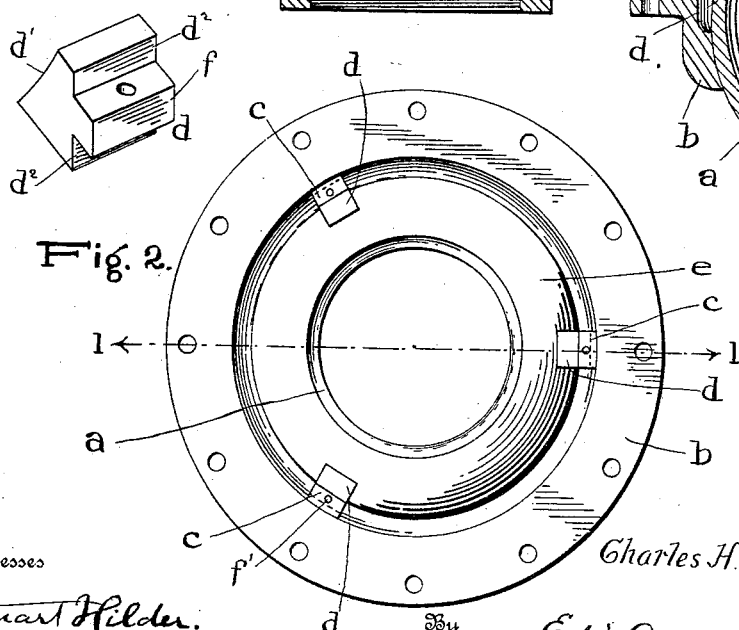
Inventor
Charles H. Jenkins
By
E. W. Anderson
his Attorney
Witnesses
Stuart Hilder.
George M. Anderson.

UNITED STATES PATENT OFFICE.

CHARLES H. JENKINS, OF LOUISVILLE, KENTUCKY.

FLEXIBLE PIPE-JOINT.

No. 910,687.  Specification of Letters Patent.  Patented Jan. 26, 1909.

Application filed July 3, 1908. Serial No. 441,823.

*To all whom it may concern:*

Be it known that I, CHARLES H. JENKINS, a citizen of the United States, resident of Louisville, in the county of Jefferson and State of Kentucky, have made a certain new and useful Invention in Flexible Pipe-Joints; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to flexible ball joints, having for its object the provision of simple and efficient means for keeping the ball in position, or to keep it from moving inward of its socket.

The invention consists in the novel construction and combinations of parts as hereinafter set forth.

In the accompanying drawings, illustrating the invention, Figure 1 is a section of the double form of ball joint, with the parts bolted together, on the line 1—1 Fig. 2; Fig. 2 is an end view of one section of the double form of joint taken from the inner end thereof; Fig. 3 is a central longitudinal section of the single form of joint, and Fig. 4 is a perspective view of one of the stud pieces.

In these drawings the letter $a$, designates the ball section of the joint and $b$, the socket section thereof, said socket section having a plurality of inner radially arranged seats $c$, $c$, $c$, three being shown, in which are secured small stud pieces $d$, $d$, $d$, which project radially within the socket section and have each a concave inner face $d'$, which is arranged to abut against the convex outer face $e$, of the inner half of the ball section. Each stud piece $d$, has a reduced lug $f$, which fits within the seat $c$, therefor and is secured therein by a pin $f'$, the square or straight face $d^2$, of the stud abutting against the similarly formed shoulders $c'$, $c'$, at each side of the seat $c$, whereby the stud is rigidly secured in position by the single pin aforesaid. The three stud pieces are arranged at equal distances from each other upon the interior of the socket section of the joint, and act to securely hold the ball section against displacement.

The use of my invention cuts cost and weight and does not obstruct the interior of the joint.

Having described my invention, what I claim and desire to secure by Letters Patent is:

1. In a flexible pipe joint, a ball section, a socket section having equidistant interior seats, and a concave annular wall at its outer end adapted to abut against the ball section to prevent outward movement thereof, and means for preventing inward movement of the ball section including removable stationary stud pieces fitting in the seats of said socket section and having concave inner faces abutting against the inner half of the convex wall of the ball section.

2. In a flexible pipe joint, a ball section, a socket section having equidistant interior seats, and a concave annular wall at its outer end adapted to abut against the ball section to prevent outward movement thereof, and means for preventing inward movement of the ball section including removable stud pieces having reduced lugs fitting in said seats, and pins securing the same therein, said stud pieces having concave inner faces abutting against the inner half of the convex wall of the ball section.

In testimony whereof I affix my signature, in presence of two witnesses.

CHARLES H. JENKINS.

Witnesses:
 L. W. BOTTS,
 E. H. BOSTON.